(12) United States Patent
Espedalen

(10) Patent No.: US 9,353,870 B2
(45) Date of Patent: May 31, 2016

(54) VALVE FOR A SUBSEA PRESSURE CANISTER

(71) Applicant: Hans Espedalen, Kongsberg (NO)

(72) Inventor: Hans Espedalen, Kongsberg (NO)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/635,013

(22) Filed: Mar. 2, 2015

(65) Prior Publication Data

US 2015/0252905 A1    Sep. 10, 2015

(30) Foreign Application Priority Data

Mar. 4, 2014   (EP) ..................................... 14157554

(51) Int. Cl.
*F16K 1/30*    (2006.01)
*F16K 1/42*    (2006.01)
*F16K 1/12*    (2006.01)
*F16K 1/02*    (2006.01)
*F16K 1/38*    (2006.01)
*F17C 5/06*    (2006.01)

(52) U.S. Cl.
CPC ... *F16K 1/30* (2013.01); *F16K 1/02* (2013.01); *F16K 1/12* (2013.01); *F16K 1/308* (2013.01); *F16K 1/38* (2013.01); *F16K 1/42* (2013.01); *F17C 5/06* (2013.01)

(58) Field of Classification Search
CPC ............. F16K 1/30; F16K 1/301; F16K 1/12; F16K 1/02; F16K 1/308; F16K 1/38; F16K 1/42; F16K 31/50; F17C 5/06
USPC .............................. 251/264, 273, 149.4, 149.5
See application file for complete search history.

(56) References Cited

U.S. PATENT DOCUMENTS

| 587,613 | A | * | 8/1897 | Schlager | .................. | F16L 29/02 |
| | | | | | | 251/149.4 |
| 2,557,807 | A | * | 6/1951 | Wagner | .................... | F16K 1/303 |
| | | | | | | 222/3 |
| 5,279,124 | A | * | 1/1994 | Aymond | .................. | B60T 11/16 |
| | | | | | | 251/149.4 |
| 2005/0005975 | A1 | | 1/2005 | Marrison et al. | | |

(Continued)

FOREIGN PATENT DOCUMENTS

| GB | 157189 A | 7/1921 |
| JP | 63-180745 | 11/1988 |

OTHER PUBLICATIONS

European Search Report in corresponding European Patent Application No. 14157554.8, dated Sep. 24, 2014.

*Primary Examiner* — Kevin Lee
(74) *Attorney, Agent, or Firm* — Lempia Summerfield Katz LLC

(57) ABSTRACT

A valve for a subsea pressure canister for controlling a fluid flow includes a valve body having a passage extending in a longitudinal direction. At an inner surface of the passage, a valve seat, a sealing section, and a threaded section are formed. A stem is arranged within the passage and movable in the longitudinal direction between a closed position and an open position. The stem includes a valve member to provide a sealing between the valve seat and the valve member in the closed position. A seal is arranged between an outer circumferential surface of the stem and the sealing section. An actuator device includes a threaded section engaged with the threaded section of the passage. The actuator device includes a coupling element for coupling the actuator device to the stem to urge the stem in the longitudinal direction upon the longitudinal movement of the actuator device.

13 Claims, 4 Drawing Sheets

(56) References Cited

U.S. PATENT DOCUMENTS

2010/0163775 A1  7/2010  Kim et al.

2015/0129057 A1*  5/2015  Shreve .................. F16K 15/063 137/538

* cited by examiner

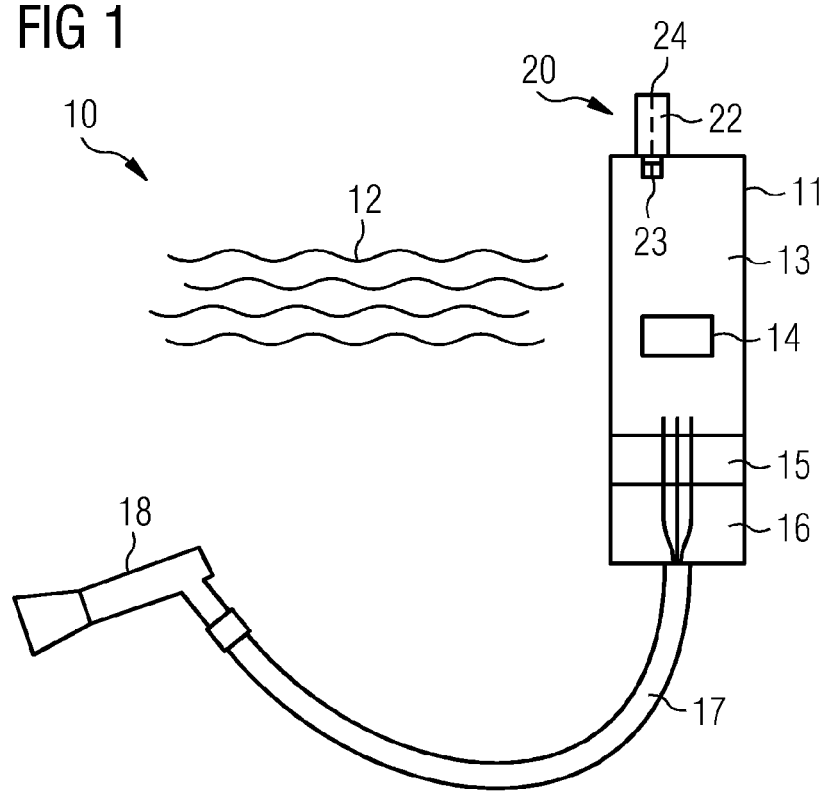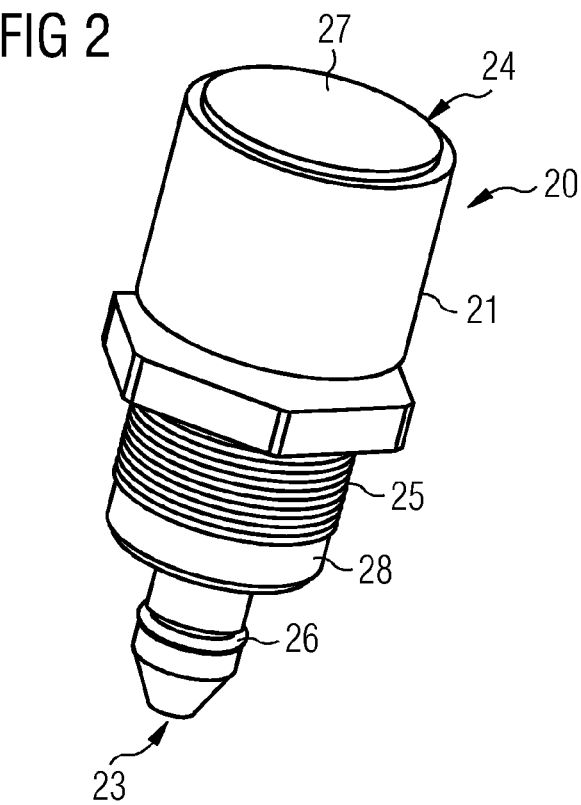

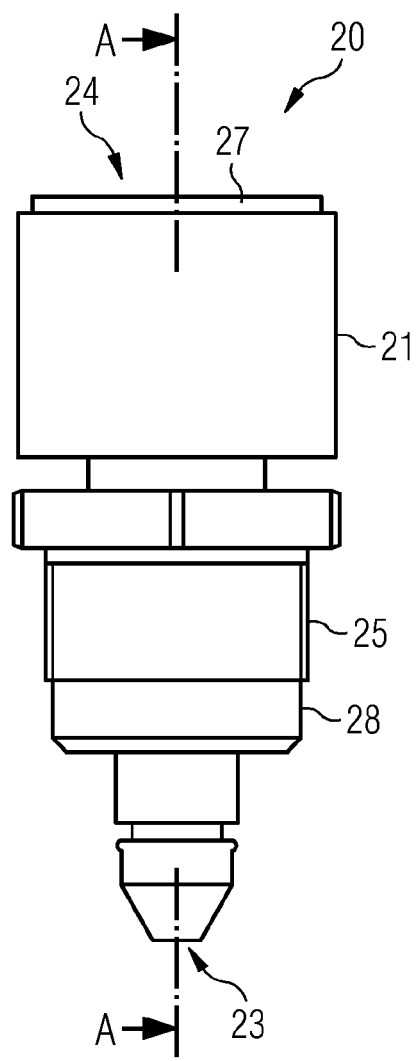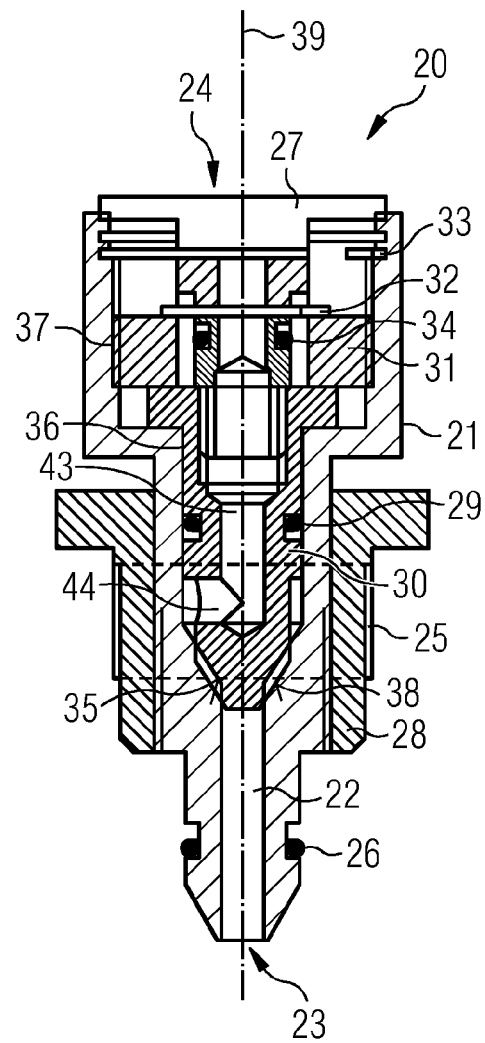

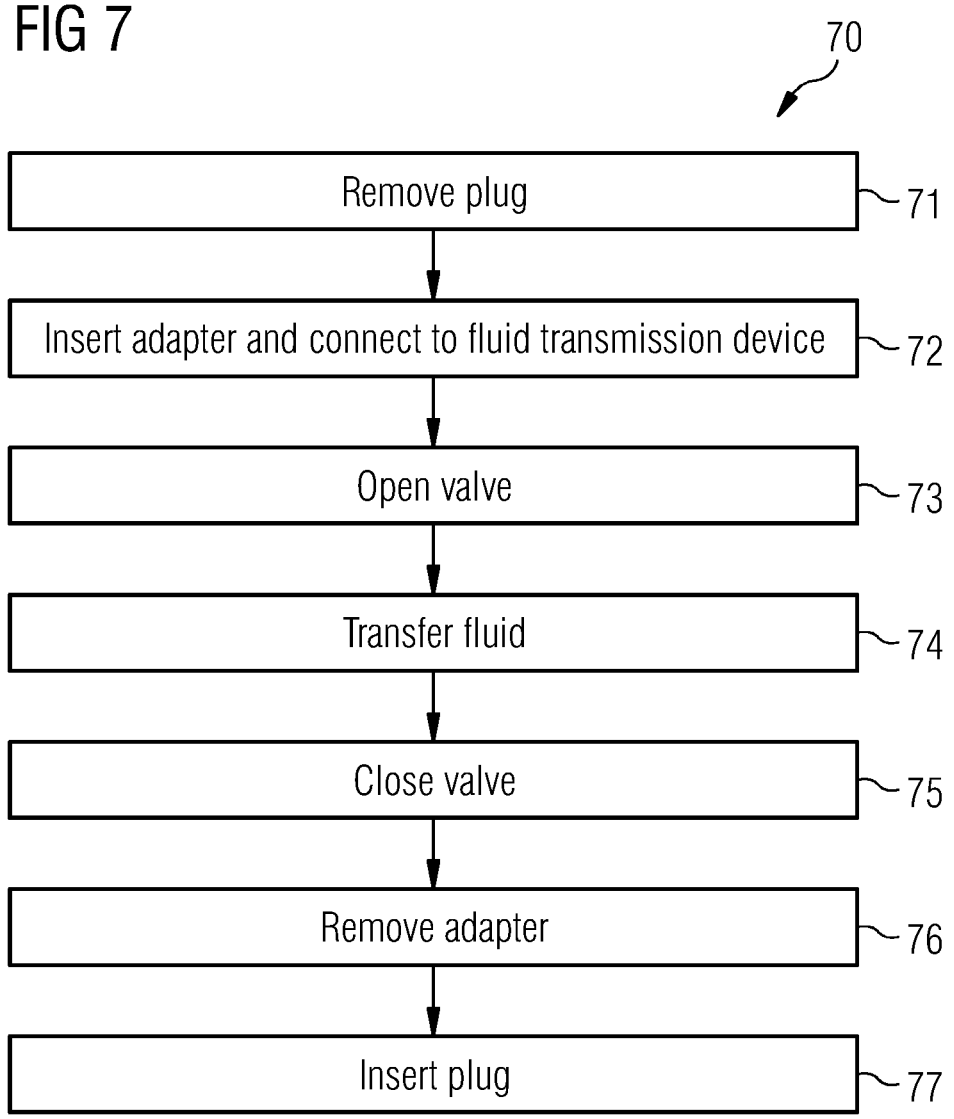

VALVE FOR A SUBSEA PRESSURE CANISTER

CROSS-REFERENCE TO RELATED APPLICATIONS

This application claims the benefit of EP 14157554.8, filed on Mar. 4, 2014, which is hereby incorporated by reference in its entirety.

TECHNICAL FIELD

The present embodiments relate to a valve for a subsea pressure canister, in particular, to a valve for controlling a fluid flow into the subsea pressure canister or out of the subsea pressure canister, for example, for filling the subsea pressure canister with a gas like $SF_6$ or for removing the gas from the canister. The valve includes a double sealing including at least a metal seal.

BACKGROUND

For subsea applications, (e.g., subsea oil production, subsea energy transmission, or subsea telecommunications), equipment to be operated subsea is configured for this harsh environment. A major obstacle in deep water is the extreme high pressure experienced by the equipment at these water depths. Accordingly, pressure-resistant vessels, so-called pressure canisters, may be used to protect the equipment at these depths from the high pressure by providing an inside pressure of approximately one atmosphere (which corresponds with approximately to 100,000 Pascal or 1 bar).

The pressure canisters used subsea to maintain and simulate an ambient pressure similar to what is experienced at the surface are also called one-atmosphere chambers, one-atmosphere vessels, or one-atmosphere canisters. A common use, for example, in the oil industry for such canisters is to protect pressure-sensitive components subsea. The pressure canisters may be operated in a depth of approximately 3,000 meters below the surface. Therefore, the pressure outside the canister may become extremely large, for example as high as 300 bar (3 million Pascal). Therefore, a high resistive sealing is required at every opening of the canister.

It may be required to fill the pressure canister with a certain gas or fluid. For example, in case the pressure canister contains electrical components, it may be required to fill the pressure canister with sulfur hexafluoride ($SF_6$) due to its dielectric properties. However, according to the Intergovernmental Penal on Climate Change, $SF_6$ is the most potent greenhouse gas and authorities very concerned for waste to the atmosphere. Therefore, a waste of $SF_6$ to the atmosphere shall be avoided, particularly during filling or removing the gas into or from the pressure canister.

Therefore, there is a need for a valve for a subsea pressure canister that offers a high degree of safety in operation and during filling and evacuation of a fluid or gas, especially $SF_6$ gas.

SUMMARY AND DESCRIPTION

The scope of the present invention is defined solely by the appended claims and is not affected to any degree by the statements within this summary. The present embodiments may obviate one or more of the drawbacks or limitations in the related art.

In certain embodiments, a valve for a subsea pressure canister is provided. The valve is configured for controlling a fluid flow. The valve includes a valve body with a passage for the fluid. The passage extends in a longitudinal direction of the valve body between a first port and a second port of the valve body and may be configured such that it may be installed at the subsea pressure canister with the first port being arranged within the subsea pressure canister and the second port being arranged at an outside of the subsea pressure canister. At an inner surface of the passage, a valve seat, a sealing section, and a threaded section are formed. The valve seat may be formed like a valve seat of a disc valve or a poppet valve. The sealing section may include a cylindrical inner wall section.

The valve also includes a valve stem arranged within the passage and movable in the longitudinal direction relative to the passage between a closed and an open position. The stem includes a valve member for providing a sealing between the valve seat and the valve member in the closed position. A seal is arranged between an outer circumferential surface of the stem and the sealing section of the passage to provide a sealing between the outer circumferential surface of the stem and the sealing section. The outer circumferential surface of the stem may include a cylindrical surface matching to and fitting into the inner cylindrical surface of the sealing section. The seal may be arranged in a groove at the outer circumferential surface of the stem or at the inner cylindrical surface of the sealing section, and may include an O-ring made of rubber or plastics or another appropriate sealing material to provide a gas and fluid tight sealing between the surfaces of the stem and the sealing section.

The valve also includes an actuator device including a threaded section engaging with the threaded section of the passage of the valve body such that a rotation of the actuator device around an axis along the longitudinal direction causes a movement of the actuator device in the longitudinal direction. In other words, the actuator device includes for example an external thread matching to an internal thread of the threaded section. By turning the actuator device, the actuator device is moved in the longitudinal direction of the passage. The actuator device includes a coupling element for coupling the actuator device to the stem. The coupling element is configured to urge the stem in the longitudinal direction upon the movement of the actuator device in the longitudinal direction. For example, the actuator device may include abutting surfaces arranged perpendicular to the longitudinal direction and configured to abut against corresponding surfaces of the stem to push the stem in the longitudinal direction. The actuator device allows moving the stem between the open position and the closed position. Due to the translation of the rotary movement into the longitudinal movement by the actuator device, a high compressive force may be applied from the actuator device on the stem to push the valve member against the valve seat in the closed position providing a reliable sealing. Furthermore, in the closed position, a double-barrier sealing is achieved by the valve seat in connection with the valve member and the seal, thus increasing sealing reliability.

According to an embodiment, the coupling element is coupled rotatably to the stem such that the actuator device maybe rotated without rotating the stem. As the stem is not rotated during the movement into the closed position, an erosion or wearing of the surfaces of the valve member and the valve seat may be avoided and a reliable sealing may be provided even when the valve is opened or closed frequently.

According to a further embodiment, the stem includes a first end and an opposing second end in the longitudinal direction. The valve member is arranged at the first end. For example, the valve seat and the valve member may be arranged near the first port whereas the threaded section may be arranged near the second port of the valve body. Likewise, the first end of the stem may be arranged near the first port of the valve body and the second end may be arranged near the second port of the valve body. For closing the valve, the stem may be moved into the direction of the first port to engage the valve element with the valve seat. In subsea conditions, the pressure at the second port is considerably higher than the pressure at the first port causing the valve member to be pressed against the valve seat by the pressure difference between the first and second ports thus providing a reliable sealing in the closed condition of the valve. The stem includes a first hole extending partly from the second end in the longitudinal direction within the stem. The first hole may include a bore in an axial direction of the stem. The first hole is not a through hole, however, but the first hole extends only partly within the stem without reaching the first end of the stem.

The stem also includes a second hole extending in a radial direction from the outer circumferential surface of the stem. The first hole and the second hole are in a fluid communication. Therefore, when the stem is arranged in the open position, a fluid may flow between the valve seat and the valve member and further through the first and second holes of the stem to provide a fluid communication between the first port and the second port of the valve in the open position. The second hole may be arranged between the valve member and the seal. The stem may be provided at the second end with a cylindrical sealing hole in fluid communication with the first hole. Furthermore, a plug may be provided including a cylindrical sealing section configured to be inserted into the sealing hole of the stem. Additionally, a seal may be arranged between the sealing section of the plug and the sealing hole of the stem to provide a fluid tight sealing between the sealing section and the sealing hole. Thus, in the closed position of the valve and with the plug being inserted into the sealing hole of the stem, a double-barrier sealing is provided. A first barrier is formed by the valve seat in combination with the valve member and a second barrier is provided by the seal arranged between the stem and the sealing section of the passage for sealing the stem against the valve body, and by the further seal to provide a sealing of the first hole in combination with the plug.

For opening the valve, the plug is to be removed and, instead, an adapter coupling the valve to a fluid conduit may be inserted into the cylindrical sealing hole at the second end of the stem. Further, the stem is to be moved into the open position. Thus, a fluid communication between the first port of the valve body and the fluid conduit is achieved for filling for example $SF_6$ gas into the subsea pressure canister or for evacuating the subsea pressure canister. The adapter is fluid tight coupled to the sealing hole by the further seal. The seal arranged between the outer circumferential surface of the stem and the sealing section of the passage provides a sealing between the stem and the valve body and, therefore, a discharge of fluid, especially of $SF_6$ gas, into the environment may be avoided.

According to another embodiment, and as described above, the seal may be arranged in a circumferential groove at the outer circumferential surface of the stem and the sealing section of the passage may be extending in the longitudinal direction at least from the position at which the seal is arranged in the closed position to at least the position at which the seal is arranged in the open position. In other words, the seal provides a sealing between the stem and the valve body in every position of the stem between the open and closed positions. Therefore, a leakage of fluid, (e.g., $SF_6$ gas), into the environment may be avoided when opening or closing the valve.

According to a further embodiment, the valve seat and the valve member are each made of a metal material. The metal material may include, for example, titanium or a stainless steel, (e.g., AISI 316). The metal-to-metal seal provides a high reliability under high-pressure subsea conditions.

According to another embodiment, the valve seat is integrally formed with the valve body. Furthermore, the valve element may be integrally formed with the stem. Thus, the number of components of the valve may be reduced and, in case the stem as well as the valve body are made of metal material, a metal-to-metal seal may be provided at low cost.

A subsea pressure canister is provided, wherein the canister includes a hole at which a valve as described above is mounted. In the open position of the valve with the adapter for the conduit mounted within the cylindrical sealing hole, a fluid or gas may be filled into the pressure canister or may be removed from the pressure canister without leaking gas or fluid into the environment. In the closed position, the subsea pressure canister is reliably sealed such that even under subsea high pressure conditions seawater cannot enter the canister through the valve.

Furthermore, a method for filling fluid into a subsea pressure canister or for removing fluid from the subsea pressure canister is provided. The subsea pressure canister is provided with the above described valve and the method includes the following acts. In one act, the plug is removed from the valve, such as from the cylindrical sealing hole provided at the second end of the stem, and an adapter is inserted into the sealing hole. The adapter includes a cylindrical sealing section configured to be inserted into the sealing hole of the stem such that the further seal provides a fluid tight sealing between the sealing section of the adapter and the sealing hole. The adapter is coupled to a fluid transmission device for example a conduit. The fluid transmission device is configured to provide an excess pressure for filling fluid into the subsea pressure canister or to provide a negative pressure for removing fluid from the subsea pressure canister. The actuator device of the valve is rotated such that the stem is moved into the open position. In the open position, a fluid communication is provided between the fluid transmission device and an interior of the subsea pressure canister via the conduit, the adapter, the first hole and the second hole within the stem, and a space between the valve seat and the valve member. Therefore, fluid may be filled into the subsea pressure canister or fluid may be removed from the subsea pressure canister by the fluid transmission device. After a desired amount of fluid has been filled into the subsea pressure canister or has been removed from the subsea pressure canister, the actuator device is rotated in the opposite direction such that the stem is moved into the closed position. The adapter is removed from the sealing hole of the stem and the plug is inserted into the sealing hole of the stem. In this condition a double-barrier sealing is provided, a first sealing by the metal-to-metal seal between the valve seat and the valve member, and a second sealing between the cylindrical sealing hole of the stem and the cylindrical sealing section of the plug. Furthermore, during the whole operation of opening and closing the valve, the seal between the outer circumferential surface of the stem and the sealing section of the passage within the valve body provides a fluid tight sealing of the stem within the valve body.

Although specific features described in the above summary and the following details description are described in connection with specific embodiments and aspects, it may be understood that the features of the exemplary embodiments and aspects may be combined with each other unless specifically noted otherwise.

BRIEF DESCRIPTION OF THE DRAWINGS

FIG. 1 depicts schematically a subsea pressure canister according to an embodiment.

FIG. 2 depicts schematically a perspective view of a valve according to an embodiment.

FIG. 3 depicts schematically a side view of the valve of FIG. 2.

FIG. 4 depicts schematically a sectional view of the valve of FIG. 2.

FIG. 7 depicts a method including acts for operating the valve of FIG. 2 according to an embodiment.

DETAILED DESCRIPTION

Figure 5:
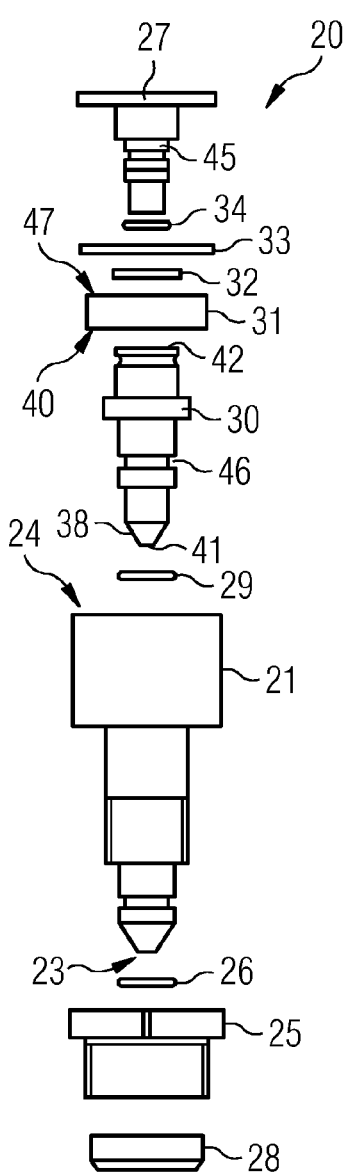
FIG. 5 depicts schematically an exploded view of the valve of FIG. 2.

In the following, exemplary embodiments will be described in more detail. It is to be understood that the features of the various exemplary embodiments described herein may be combined with each other unless specifically noted otherwise. Same reference signs in the various drawings refer to similar or identical components. For clarity reasons, in some of the drawings, not every component is designated by a corresponding reference sign and these components may be referenced in the following detailed description by corresponding reference signs defined in other drawings.

FIG. 1 schematically depicts a subsea pressure canister 11 in a subsea environment 10. The subsea canister 11 or subsea vessel 11 is used for housing components 14 in an interior 13 for protecting the components 14 from high pressure present in deep sea water 12. For coupling the components 14 with other equipment, the subsea canister 11 may include a port 16, (for example, an oil-filled pressure compensated chamber 16), and an electrical penetrator 15 providing electrical lines arranged in an oil-filled conduit 17. The other end of the conduit 17 may include a connector 18 for coupling the conduit 17 to another subsea or land-based equipment.

The canister 11 may be arranged in deep water, for example, in depths of 3.000 meters. Therefore, a pressure exerted on the canister 11 by the seawater 12 may become as large as, for example, 300 bar. For enabling operation of standard components 14 in such a harsh environment, the subsea pressure canister 11 may provide a pressure in the interior 13 of the canister 11 of for example approximately 1 bar. For electrical reasons, for example, for avoiding electrical arcs inside the canister 11, the interior 13 of the subsea pressure canister 11 may be filled with a gas or fluid, for example, sulfur hexafluoride ($SF_6$). For introducing or removing the fluid, a valve 20 is provided at a hole or an opening of the subsea pressure canister 11. As $SF_6$ gas may harm the environment, a safe transfer of $SF_6$ gas from and into the subsea pressure canister 11 has to be provided to avoid leakage of the $SF_6$ gas into the environment. Furthermore, when the subsea pressure canister 11 is arranged in subsea environment, an intrusion of seawater 12 into the subsea pressure canister 11 shall be avoided. Therefore, the valve 20 described in more detail below is provided at the hole or opening of the subsea pressure canister 11.

The valve 20 includes a first port 23 in fluid communication with the interior 13 of the canister 11 and second port 24 in a fluid communication with the environment of the canister 11. A passage 22 is extending between the first port 23 and the second port 24 to enable a fluid transfer between the interior 13 of the canister 11 and the environment in an open state of the valve 20, whereas the passage 22 is blocked when the valve 20 is in a closed state.

FIG. 2 depicts the valve 20 in more detail. The valve 20 includes a housing or body 21 through which the above described passage 22 is extending. In FIG. 2, the first port 23, which may be directed into the interior 13 of the subsea pressure canister 11, is arranged at the lower side. The second port 24 of the valve 20 is depicted in FIG. 2 at an upper side and is closed by a lid or plug 27. For mounting the valve 20 at the canister 11, a body nut 25 and a body collar 28 may be provided. For providing a sealing between the body 21 of the valve 20 and the housing of the canister 11, a seal 26, for example, an O-ring, may be provided in a corresponding groove of the body 21.

FIG. 3 depicts a side view of the valve 20 depicted in FIG. 2. FIG. 4 depicts a sectional view of the valve 20 of FIGS. 2 and 3 providing more details of the interior of the valve 20. FIG. 5 depicts an exploded view of the valve 20. The components and the principle of the valve 20 will be described in more detail in the following with reference to FIGS. 4 and 5.

The passage 22 is extending through the body 21 of the valve 20 in a longitudinal direction 39 from the first port 23 to the second port 24. At an inner surface of the passage 22 a valve seat 35, a sealing section 36 and a threaded section 37 are formed. The valve seat 35 is located at the first port 23 and the threaded section 37 is located at the second port 24. The sealing section 36 is located between the valve seat 35 and the threaded section 37. A stem 30 is arranged in the passage 22. The stem 30 has a first end 41 and a second end 42 in the longitudinal direction 39. The first end 41 is directed to the first port 23 and the second end 42 is directed to the second port 24. At the first end 41 a valve member 38 is formed. The valve member 38 has a frustoconical shape. The valve seat 35 of the passage 22 has also a frustoconical shape that is complementary to the frustoconical shape of the valve seat 35. The valve seat 35 is integrally formed with the body 21 and the valve member 38 is integrally formed with the stem 30. The body 21 as well as the stem 30 are made of a metal material, for example, stainless steel or titanium. Therefore, the valve member 38 and the valve seat 35 cooperate like a poppet valve having a metal-to-metal seal.

The stem 30 is movable in the longitudinal direction 39 within the passage 22. In a middle part of the stem 30, the stem has a cylindrical shape fitting into the cylindrical shape of the sealing section 36 of the passage 22. In a circumferential direction of the cylindrical shape of the stem 30, a groove 46 is provided to receive a seal 29. The seal may include an O-ring and may be made of rubber or plastics. Due to the seal 29, a fluid tight sealing between the stem 30 and the sealing section 36 of the passage 22 may be provided even when the stem 30 is moved in the longitudinal direction 39 within the passage 22. Starting at the second end 42 of the stem 30, a first hole or bore 43 is provided concentrically within the stem 30 and extending in the longitudinal direction 39. The first hole 43 does not extend to the first end 41, however, but ends between the valve member 38 and the groove 46 of the stem 30. A second hole or bore 44 is provided in a radial direction perpendicular to the longitudinal direction 39 within the stem 30 at a position between the valve member 38 and the groove 46, such as at a position where the first hole 43 ends such that a fluid communication between the first hole 43 and the second hole 44 is provided. At the second end 42 of the stem 30, a cylindrical sealing hole is provided, where the cylindrical sealing hole is in a fluid communication with the first hole 43. The cylindrical sealing hole at the second end 42 is dimensioned such that a cylindrical sealing section 45 of the plug 27 may be fitted into the cylindrical sealing hole. Furthermore, a further seal 34, (e.g., an O-ring), may be arranged in a groove at the cylindrical sealing section 45 of the plug 27 such that a fluid tight sealing between the cylindrical sealing section 45 and the cylindrical sealing hole of the stem 30 is accomplished when the plug 27 is inserted into the second end 42 of the stem 30.

As described above, the stem 30 is movable in the longitudinal direction 39 within the passage 22 of the valve 20. For moving the stem 30, an actuator device 31, (e.g., a nut or stem nut), is provided within the threaded section 37 of the passage 22 of the valve body 21. The actuator device 31 includes a threaded section, (e.g., an external thread), which matches to an internal thread of the threaded section 37. Thus, the actuator device 31 is moving along the longitudinal direction 39 when the actuator device 31 is rotated around an axis along the longitudinal direction 39. The actuator device 31 includes a first and a second coupling element 40, 47 for coupling the actuator device 31 to the stem 30. The first coupling element 40 may be formed, for example, by an annular planar surface of the actuator device 31 abutting against an annular planar surface of the stem 30. The second coupling element 47 may include a second planar surface of the actuator device 31 opposite to the first planar surface of the actuator device 31 abutting against a circular clip 32 arranged for example at a groove at the second end 42 of the stem 30. When the actuator device 31 is moved in a downward direction in FIG. 4 by rotating the actuator device 31, the first planar surface 40 of the actuator device 31 abuts against the planar surface provided at the stem 30 and urges the stem 30 in the downward direction such that the valve member 38 of the stem 30 is pressed against the valve seat 35 of the passage 22 and a fluid tight metal-to-metal sealing is accomplished. In this situation, the valve 20 is in its closed position. When the actuator device 31 is rotated in the counter direction, the second planar surface 47 abuts against the circular clip 32 and urges or pulls the stem 30 in the upward direction. Due to the movement in the upward direction, a gap between the valve seat 35 and the valve member 38 is generated and the valve 20 is in its open position. In the open position, a fluid communication is provided from the first port 23 through the gap between the valve seat 35 and the valve member 38, and through the second hole 44 and the first hole 43 to the second end 42 of the stem 30. For limiting a movement of the actuator device 31 in an upward direction, a further circular clip 33 may be provided at an upper end of the threaded section of the passage 22.

Figure 6:
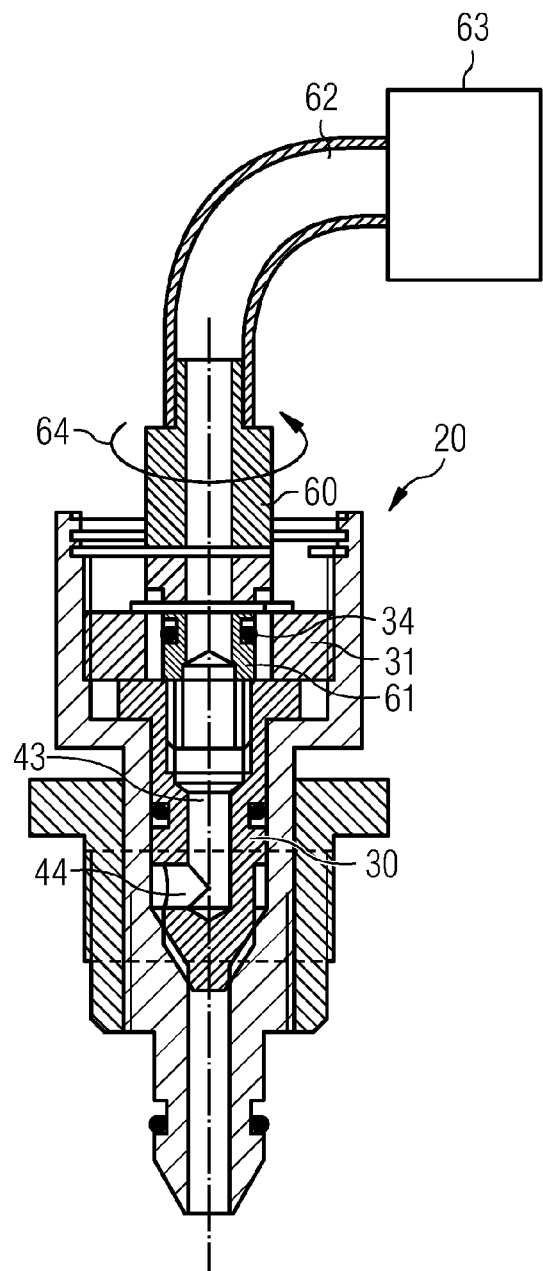
FIG. 6 depicts schematically a sectional view of the valve of FIG. 2 in connection with a fluid transmission device.

Operation of the valve 20 will be described in more detail in the following in connection with FIGS. 4, 6, and 7.

FIG. 4 depicts the valve 20 in its closed position. The stem 30 is urged by the actuator device 31 in the downward direction in FIG. 4 such that the valve member 38 is pressed against the valve seat 35 to provide a fluid tight sealing at the first port 23. Furthermore, the seal 29 provides a fluid tight sealing between the stem 30 and the sealing section 36 of the passage 22 and, furthermore, the plug 27 provides in combination with the seal 34 a fluid tight sealing between the plug 27 and the second end 42 of the stem 30. Therefore, a double sealing is provided, including the metal-to-metal seal between the valve seat 35 and the valve member 38 and the sealing the between the stem 30 and the body 21 as well as the sealing between the stem 30 and the plug 27. In the closed position of the valve 20, the double sealing provides a high reliability to avoid intrusion of seawater 12 when the subsea pressure canister 11 is arranged in a high pressure subsea environment 10.

As described above, the valve 20 may be used for transferring gas, (e.g., SF$_6$, into the subsea pressure canister or out of the subsea pressure canister 11. A method 70 for filling fluid into the subsea pressure canister 11 or for removing fluid from the subsea pressure canister 11 includes the following acts 71-77. The fluid to be transferred into the canister 11 or removed from the canister 11 may be stored in a fluid transmission device 63 that is configured to provide an excess pressure for filling fluid into the subsea pressure canister 11 or to provide a negative pressure for removing fluid from the subsea pressure canister 11.

According to the method 70, in act 71, the plug 27 is removed. Instead of the plug 27, an adapter 60 is inserted into the sealing hole of the stem 30. The adapter 60 has a sealing section 61 provided with a seal 34 to provide a fluid tight connection with the sealing hole of the stem 30. As may be seen from FIG. 6, a fluid passage through the adapter 60 to the first and second holes 43 and 44 is now provided. The adapter 60 is coupled to a conduit 62 that is coupled to the fluid transmission device 63. Thus, in act 72, by inserting the adapter 60 into the sealing hole of the stem 30, a connection to the fluid transmission device 63 is provided. In act 73, the valve 20 is opened by rotating the actuator device 31 in a first direction, for example, in a counter clockwise direction as indicated by arrow 64. By rotating the actuator device 31, the actuator device 31 is moved upwards in the longitudinal direction 39 and guides via the circular clip 32 at the stem 30 in an upward direction such that a gap between the valve seat 35 and the valve member 38 is generated and the valve 20 is opened. As the coupling between the actuator device 31 and the stem 30 via the circular clip 32 does not transmit the rotation from the actuator device 31 to the stem 30, the stem 30 may be moved without rotation. This enables the adapter 60 and the conduit 62 to be connected to the stem 30 without being rotated when the valve is opened. Thus, a fluid communication between the fluid transmission device 63 to the interior 13 of the subsea pressure canister 11 is provided via the conduit 62, the adapter 60, the first hole 43, the second hole 44, and the gap between the valve member 38 and the valve seat 35. In act 74, the fluid or gas may be transferred between the fluid transmission device 63 and the interior 13 of the subsea pressure canister 11. In act 75, the valve 20 is closed by turning the actuator device 31 in a clockwise direction thus urging the stem 30 in a downward direction to close the gap between the valve seat 35 and the valve member 38. When the valve 20 is its closed position, the adapter 60 may be removed in act 76 and the plug 27 is inserted at the second port 24 of the valve 20 in act 77.

The above described valve 20 may be designed for a working depth of 3,000 meters. The body 21 and the stem 30 may be made of titanium or stainless steel, (e.g., AISI 316). The whole valve may have a length of approximately 100 mm and a diameter of approximately 45 mm. In its open state, the path through the first and second holes 43, 44 and the gap between the valve seat 35 and the valve member 38 may be designed such that a fluid flow of at least 1 l/min of gas or another fluid may be achieved at a pressure difference of 10 bar.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A valve for a subsea pressure canister for controlling fluid flow, the valve comprising:
   a valve body comprising a passage for a fluid extending in a longitudinal direction between a first port and a second port of the valve, wherein a valve seat, a sealing section, and a threaded section are provided at an inner surface of the passage;
   a stem arranged within the passage and movable in the longitudinal direction relative to the passage between a closed position and an open position, wherein the stem comprises a valve member to provide a first sealing between the valve seat and the valve member in the closed position;
   a seal arranged between an outer circumferential surface of the stem and the sealing section of the passage to provide a second sealing between the outer circumferential surface of the stem and the sealing section;
   an actuator device comprising a threaded section engaging with the threaded section of the passage of the valve body such that a rotation of the actuator device around the longitudinal direction causes a movement of the actuator device in the longitudinal direction, wherein the actuator device comprises a coupling element for coupling the actuator device to the stem configured to urge the stem in the longitudinal direction upon the longitudinal movement of the actuator device;
   a plug comprising a cylindrical sealing section configured to be inserted into a cylindrical sealing hole of the stem; and
   a further seal arranged between the cylindrical sealing section of the plug and the cylindrical sealing hole of the stem to provide a fluid tight sealing between the cylindrical sealing section and the cylindrical sealing hole.

2. The valve according to claim 1, wherein the coupling element is coupled rotatably to the stem such that the actuator device is configured to be rotated without rotating the stem.

3. The valve according to claim 2, wherein the stem comprises a first end and an opposing second end in the longitudinal direction, wherein the valve member is arranged at the first end, and wherein the stem comprises a first hole extending partly from the second end in the longitudinal direction within the stem, and a second hole extending in a radial direction from the outer circumferential surface of the stem, wherein the first hole is in fluid communication with the second hole.

4. The valve according to claim 3, wherein the second end of the stem comprises the cylindrical sealing hole in fluid communication with the first hole.

5. The valve according to claim 3, wherein the second hole is arranged between the valve member and the seal.

6. The valve according to claim 1, wherein the stem comprises a first end and an opposing second end in the longitudinal direction, wherein the valve member is arranged at the first end, and wherein the stem comprises a first hole extending partly from the second end in the longitudinal direction within the stem, and a second hole extending in a radial direction from the outer circumferential surface of the stem, wherein the first hole is in fluid communication with the second hole.

7. The valve according to claim 1, wherein the seal is arranged in a circumferential groove at the outer circumferential surface of the stem, and wherein the sealing section of the passage extends in the longitudinal direction at least between the closed position at which the seal is arranged to at least the open position at which the seal is arranged.

8. The valve according to claim 1, wherein both the valve seat and the valve member are made of a metal material.

9. The valve according to claim 1, wherein the valve seat is integrally formed with the valve body.

10. The valve according to claim 1, wherein the valve member is integrally formed with the stem.

11. A subsea pressure canister comprising:
    a valve comprising:
       a valve body comprising a passage for a fluid extending in a longitudinal direction between a first port and a second port of the valve, wherein a valve seat, a sealing section, and a threaded section are provided at an inner surface of the passage;
       a stem arranged within the passage and movable in the longitudinal direction relative to the passage between a closed position and an open position, wherein the stem comprises a valve member to provide a first sealing between the valve seat and the valve member in the closed position;
       a seal arranged between an outer circumferential surface of the stem and the sealing section of the passage to provide a second sealing between the outer circumferential surface of the stem and the sealing section; and
       an actuator device comprising a threaded section engaging with the threaded section of the passage of the valve body such that a rotation of the actuator device around the longitudinal direction causes a movement of the actuator device in the longitudinal direction, wherein the actuator device comprises a coupling element for coupling the actuator device to the stem configured to urge the stem in the longitudinal direction upon the longitudinal movement of the actuator device;
       a plug comprising a cylindrical sealing section configured to be inserted into a cylindrical sealing hole of the stem; and
       a further seal arranged between the cylindrical sealing section of the plug and the cylindrical sealing hole of the stem to provide a fluid tight sealing between the cylindrical sealing section and the cylindrical sealing hole; and
    a hole at which the valve is mounted.

12. A method for filling fluid into a subsea pressure canister or for removing fluid from the subsea pressure canister, the subsea pressure canister being provided with a valve comprising (1) a valve body comprising a passage for a fluid extending in a longitudinal direction between a first port and a second port of the valve, wherein a valve seat, a sealing section, and a threaded section are provided at an inner surface of the passage, (2) a stem arranged within the passage and movable in the longitudinal direction relative to the passage between a closed position and an open position, wherein the stem comprises a valve member to provide a first sealing between the valve seat and the valve member in the closed position, (3) a seal arranged between an outer circumferential surface of the stem and the sealing section of the passage to provide a second sealing between the outer circumferential surface of the stem and the sealing section; and (4) an actuator device comprising a threaded section engaging with the threaded section of the passage of the valve body such that a rotation of the actuator device around the longitudinal direction causes a movement of the actuator device in the longitudinal direction, wherein the actuator device comprises a coupling element for coupling the actuator device to the stem configured to urge the stem in the longitudinal direction upon the longitudinal movement of the actuator device, wherein the stem comprises a first end and an opposing second end in the longitudinal direction, wherein the valve member is arranged at the first end, and wherein the stem comprises a first hole extending partly from the second end in the longitudinal direction within the stem, and a second hole extending in a radial direction from the outer circumferential surface of the stem, wherein the first hole and the second hole are in a fluid communication, wherein the stem is provided at the second end with a cylindrical sealing hole in fluid communication with the first hole, wherein the valve further comprises a plug comprising a cylindrical sealing section configured to be inserted into the cylindrical sealing hole of the stem, and a further seal arranged between the sealing section of the plug and the sealing hole of the stem to provide a fluid tight sealing between the sealing section and the sealing hole, the method comprising:

removing the plug from the valve;

inserting an adapter into the sealing hole of the stem, the adapter comprising a cylindrical sealing section configured to be inserted into the sealing hole of the stem, wherein the further seal provides a fluid tight sealing between the sealing section of the adapter and the sealing hole, wherein the adapter is coupled to a fluid transmission device configured to provide an excess pressure for filling fluid into the subsea pressure canister or a negative pressure for removing fluid from the subsea pressure canister;

rotating the actuator device to move the stem in the open position;

filling fluid into the subsea pressure canister or removing fluid from the subsea pressure canister by the fluid transmission device;

rotating the actuator device to move the stem in the closed position;

removing the adapter from the sealing hole of the stem; and inserting the plug into the sealing hole of the stem.

13. A valve for a subsea pressure canister for controlling fluid flow, the valve comprising:

a valve body comprising a passage for a fluid extending in a longitudinal direction between a first port and a second port of the valve, wherein a valve seat, a sealing section, and a threaded section are provided at an inner surface of the passage;

a stem arranged within the passage and movable in the longitudinal direction relative to the passage between a closed position and an open position, wherein the stem comprises a valve member to provide a first sealing between the valve seat and the valve member in the closed position;

a seal arranged between an outer circumferential surface of the stem and the sealing section of the passage to provide a second sealing between the outer circumferential surface of the stem and the sealing section; and an actuator device comprising a threaded section engaging with the threaded section of the passage of the valve body such that a rotation of the actuator device around the longitudinal direction causes a movement of the actuator device in the longitudinal direction, wherein the actuator device comprises a coupling element for coupling the actuator device to the stem configured to urge the stem in the longitudinal direction upon the longitudinal movement of the actuator device, wherein the valve is configured to control fluid flow into and out of the subsea pressure canister.

\* \* \* \* \*